United States Patent [19]

Renaudin

[11] Patent Number: 4,756,381
[45] Date of Patent: Jul. 12, 1988

[54] FOUR-WHEEL DRIVE TRANSMISSION DEVICE

[75] Inventor: Alain Renaudin, Maurepas, France

[73] Assignee: Regie Nationale des Usines Renault, Boulogne Billancourt, France

[21] Appl. No.: 14,851

[22] Filed: Feb. 2, 1987

[30] Foreign Application Priority Data

Jan. 31, 1986 [FR] France ................. 86 01363

[51] Int. Cl.⁴ .............................................. B60K 23/08
[52] U.S. Cl. .................................................... 180/249
[58] Field of Search ............... 180/249, 248, 250, 247; 74/711

[56] References Cited

U.S. PATENT DOCUMENTS

| 2,821,868 | 2/1958 | Gregory | 180/248 |
| 3,830,116 | 8/1974 | Fisher | 74/711 |
| 4,245,525 | 5/1982 | Lebeque | 74/711 |
| 4,420,059 | 12/1983 | Suzuki | 180/249 |
| 4,452,331 | 6/1984 | Lunn et al. | 180/247 |

FOREIGN PATENT DOCUMENTS

| 640950 | 4/1964 | Belgium . |
| EP068309 | 1/1983 | European Pat. Off. . |
| 1431408 | 1/1966 | France . |
| 2589109 | 4/1987 | France . |
| 453912 | 9/1936 | United Kingdom . |
| 2057987 | 4/1981 | United Kingdom . |

*Primary Examiner*—John A. Pekar
*Attorney, Agent, or Firm*—Oblon, Fisher, Spivak, McClelland & Maier

[57] ABSTRACT

Four-wheel drive transmission device, characterized in that it comprises a secondary shaft (2), which is connected to the input of the central differential (4); an output of said central differential (4) driving the drive gear (3) of the coaxial front axle and being mounted on the inside of said secondary shaft (2), said drive gear driving a ring gear (29) solid with the front differential; the other output of the central differential (4) driving a coaxial rear driveshaft (15) and in the extension of said drive gear (3).

7 Claims, 4 Drawing Sheets

FOUR-WHEEL DRIVE TRANSMISSION DEVICE

BACKGROUND OF THE INVENTION

This invention relates to a four-wheel drive transmission device which is applied particularly to passenger motor vehicles.

Numerous four-wheel drive devices are known which comprise a mechanism box at the outlet of the transmission to transmit the movement to the front axle and to the rear axle. Each axle has a differential placed between the wheels, and which receives the movement from the mechanism box. Certain devices offer, in addition, the presence of a differential between the front axle and the rear axle, this differential being placed directly at the outlet of the mechanism box. So as not to increase considerably the consumption of fuel, these mechanisms make it possible to function either in two-wheel drive or in four-wheel drive. For this reason, a control available to the driver makes it possible to go into four-wheel drive. These devices exhibit the drawback, when they are in two-wheel drive, of presenting a risk of loss of adherence of a wheel. In this case, the driver of the vehicle must very quickly lock the transmission of the vehicle into four-wheel drive. This clutching maneuver must be made when stopped or at very low speed. Consequently, the manipulation of these four-wheel drive devices is very difficult, and in addition it is very difficult to perform it at the best moment. Finally, this type of transmission requires the constant attention of the driver of the vehicle, which is achieved at the expense of driving safety.

SUMMARY OF THE INVENTION

The object of this invention is to propose a four-wheel drive transmission device which makes it possible to make the four-wheel drive clutching maneuver automatic; the device adapting perfectly to the adherence conditions of each of the wheels of the vehicle. In addition, the transmission device according to the invention must have a design which adapts easily to the new structures of motor vehicles.

For this purpose, the four-wheel drive transmission device according to the invention comprises a secondary shaft which is connected to the input of a central differential. An output of said central differential drives the drive gear of the coaxial front axle, and is mounted inside said secondary shaft, said drive gear driving a ring gear solid with the front differential. The other output of the central differential drives a rear coaxial drive shaft and in the extension of said drive gear.

According to an embodiment of the invention, a self-locking system is placed on the outputs of movement of the central differential.

According to an embodiment of the invention, a self-locking system is placed on the outputs of movement of the front differential.

According to an embodiment of the invention, a speed differential retardation device is placed on the outputs of movement of the differential of the rear axle.

According to an embodiment of the invention, the speed differential retardation device is a viscous system.

According to an embodiment of the invention, the speed differential retardation device is a mechanical unit with initial load washers.

According to an embodiment of the invention, the speed differential retardation device is a mechanical unit with axial compression springs.

According to an embodiment of the invention, the engine and the transmission of the vehicle are placed longitudinally in the vehicle.

According to an embodiment of the invention, the viscous system comprises a multidisk unit with interdigitated disks in a controlled-viscosity fluid which is enclosed by a closing hub and having sealing means.

According to an embodiment of the invention, the viscous system placed on the central differential has:

its hub solid with the rear drive shaft connected to the sun gear of said central differential;

its ring part connected to the planet carrier of said central differential;

its support flange solid with the ring part;

its closing flange;

its sealing means which consist of two seals placed between said hub and said support flange on the one hand; and a seal placed between said closing flange and said ring part.

According to an embodiment of the invention, the viscous system placed on the central differential has:

its hub solid with the drive gear, which is connected to the sun gear of said central differential;

its ring part connected to the planet carrier of said central differential;

its support flange solid with the ring part;

its closing flange solid with the rear drive shaft and connected to said ring part;

its sealing means which consist of two seals placed respectively between said hub and said support flange on the one hand and a said closing flange on the other hand; and a seal placed between said closing flange and said ring part.

According to an embodiment of the invention, the rear driveshaft is connected to the drive shaft by means of a coupling plate.

According to an embodiment of the invention, the transmission housing carries a rear housing which receives a closing flange carrying the bearing of the rear drive shaft, which is supported by the end of the drive gear by means of a needle bearing.

The four-wheel drive transmission device according to the invention thus exhibits the advantage of offering great safety. Actually, in case of loss of adherence of any one of the wheels, the transmission immediately goes to four-wheel drive. The attention of the driver can thus be solely devoted to the driving of his vehicle, which considerably increases safety, especially in case of poor weather conditions. In addition, the unit of the device makes it possible to solve problems posed by the design of the vehicle, and offers more flexibility in the possible arrangement of the various mechanical elements.

BRIEF DESCRIPTION OF THE DRAWINGS

Other characteristics and advantages of this invention will come out from the following description of an embodiment given by way of examples with reference to the accompanying drawings in which.

DETAILED DESCRIPTION OF THE PREFERRED EMBODIMENT

Figure 1:
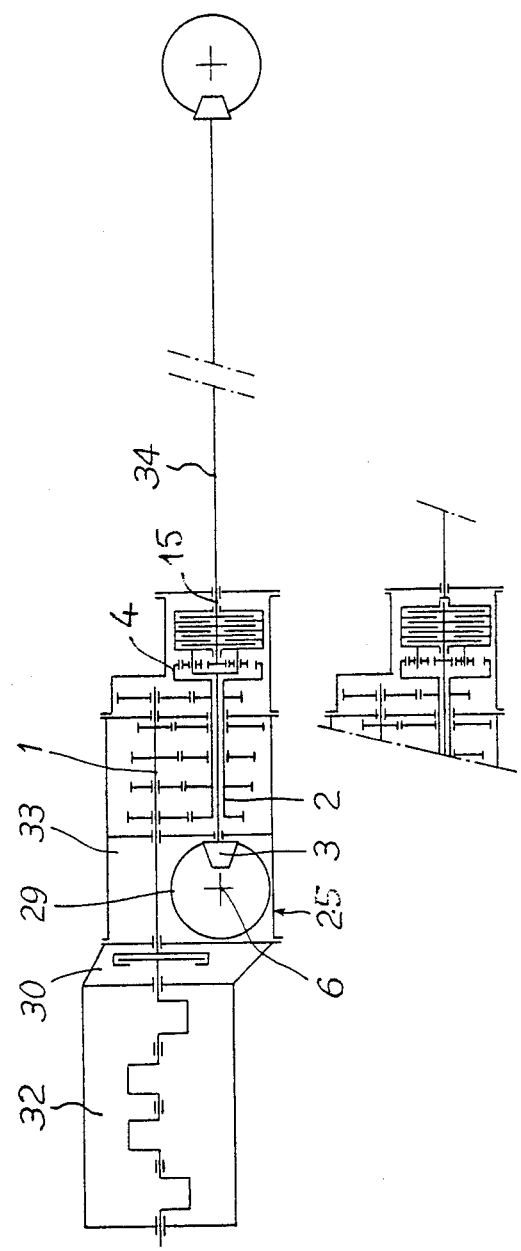
FIG. 1 is a diagrammatic longitudinal view of the transmission unit according to the invention.

The four-wheel drive transmission device according to the invention is placed at the outlet of a transmission 33 which is driven by an engine 32. In the case of the figures, this engine 32-transmission 33 unit is placed longitudinally in the vehicle. It should be noted also that in the case of the figures the device according to the invention is mounted on a power train placed in the front of the vehicle. It is obvious that this device could apply to a power train placed in the rear, and in this case everything that will be called front axle and rear axle in the following description would become reciprocally rear axle and front axle.

The clutch is placed in a clutch housing 30 which is fastened to engine 32. Clutch housing 30 carries a housing 25 of transmission 33. Housing 25 of transmission 33 carries a rear housing 26 which receives a closing flange 27. The unit of the device according to the invention is placed in housings 25, 26 and 27.

Transmission 33 comprises a primary shaft 1 and a secondary shaft 2. Secondary shaft 2 is connected to the input of the central differential (4, 39). An output of movement of central differential 4 drives drive gear 3 of ring gear 29 of the front axle whose axis is referenced 6. The other output of movement of central differential (4, 39) drives coupling plate 38 solid with drive shaft 34.

A speed differential retardation device is placed between the outputs of movement of the central differential (4, 39) so as to be able to transfer automatically a portion of the energy of the axle which would be losing adherence to the other axle.

Figure 2:
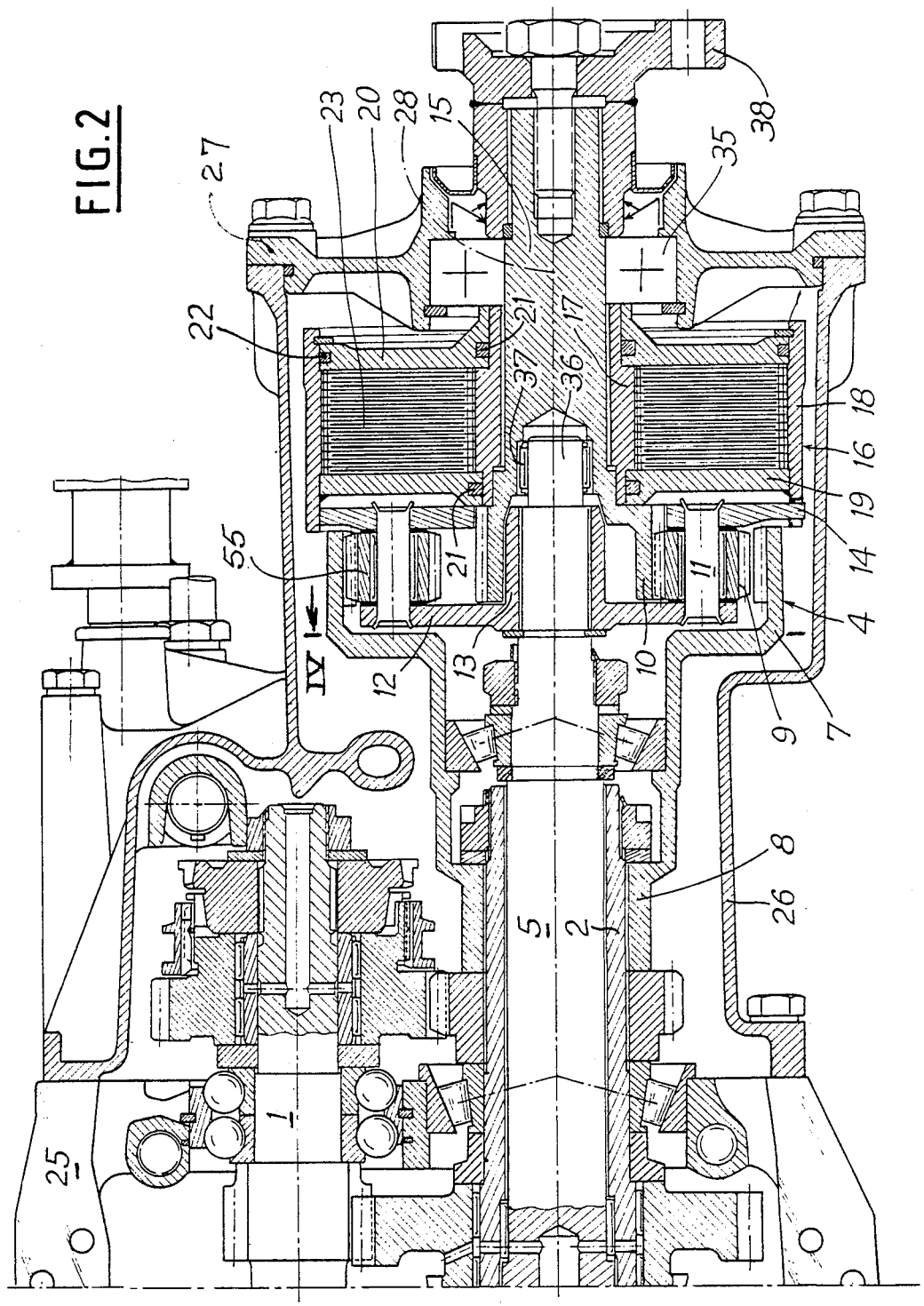
FIG. 2 is a view in partial section corresponding to FIG. 1.
Figure 3:
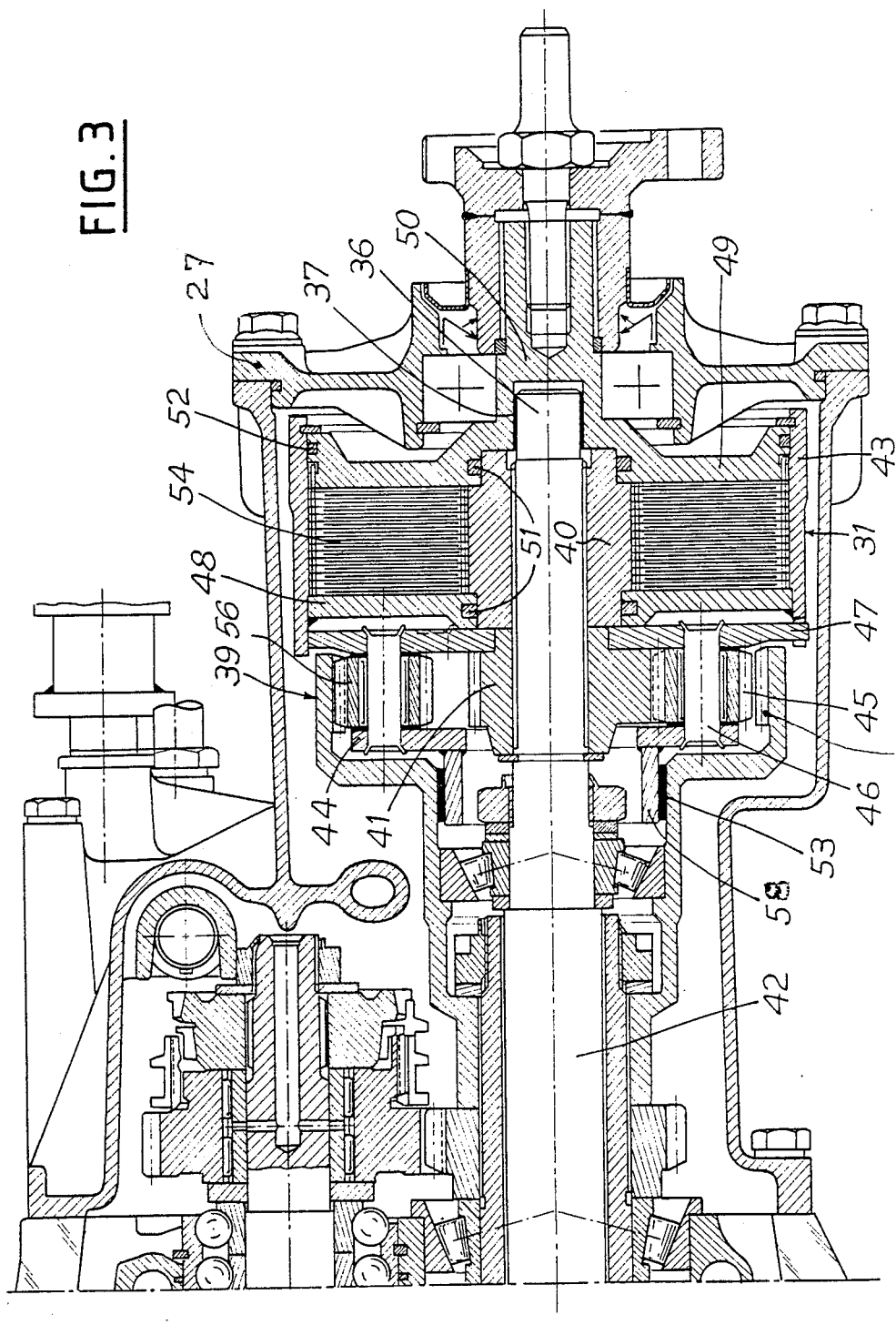
FIG. 3 is a view in partial section corresponding to FIG. 1 of another embodiment of the invention.
Figure 4:
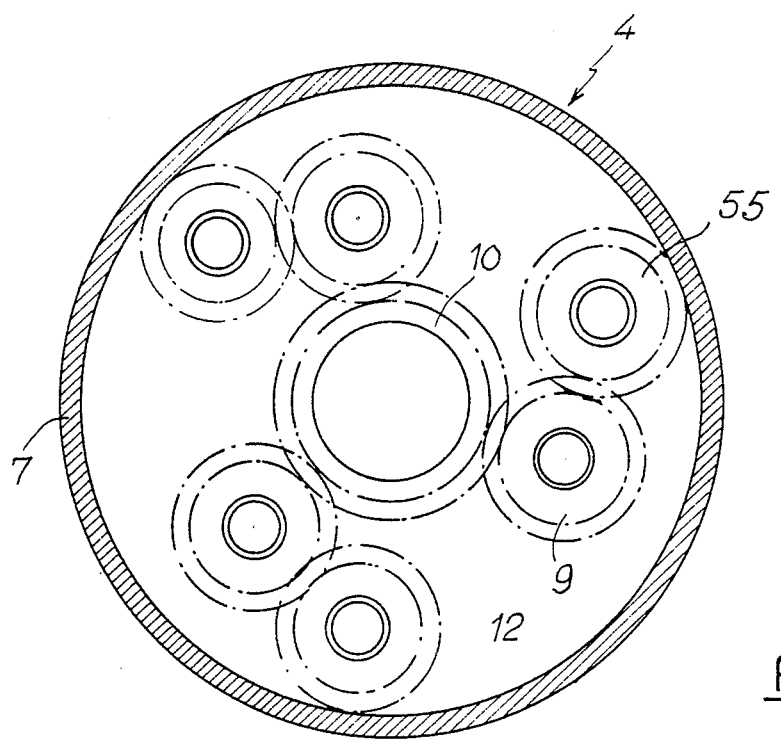
FIG. 4 is a view along IV of FIG. 2.

In the case of the figures, the speed differential retardation device is a viscous system 16 for FIG. 2 and a viscous system 31 for FIG. 3. A speed differential retardation device of the mechanical unit type having initial load washers could also be mounted. A mechanical unit having compression axial springs could also be provided as the speed differential retardation device.

A speed differential retardation device is placed between the outputs of movement of the front differential.

In the same way, a speed differential retardation device is placed between the outputs of movement of the differential of the rear axle.

Likewise for the speed differential retardation device placed between the outputs of central differential 4, 39, the speed differential retardation device placed between the outputs of the front differential or between the outputs of the differential of the rear axle, these speed differential retardation devices each are a viscous system. A speed differential retardation device of the mechanical unit type having initial load washers could also be provided. A speed differential retardation device of the mechanical unit type having compression axial springs could also be provided.

In the embodiment of the invention shown in FIG. 2, secondary shaft 2 of transmission 33 is solid with hub 8 of ring gear 7 of central differential 4. A first output of movement of central differential 4 is provided by planet carrier 12 of said central differential 4. This planet carrier 12 is solid with a secondary pin 5, which is coaxial to secondary shaft 2. This secondary pin 5 goes inside secondary shaft 2, and it ends with drive gear 3. The other output of movement of central differential 4 is provided by sun gear 10, which is solid with rear drive shaft 15. This rear drive shaft 15 is itself solid in rotation by means of grooves with coupling plate 38. This rear drive shaft 15 is supported on the one hand by a bearing 35 mounted in closing flange 27, and on the other hand by end 36 of drive gear 3 and of secondary pin 5 by means of a needle bearing 37.

Planet gears 9 and 55 of central differential 4 are mounted on pins 11, which are supported by planet carrier 12 and by a drive flange 14. Planet carrier 12 is solid with secondary pin 5 by means of its hub 13 which is connected to said secondary pin 5 by means of grooves. The groups of planet gears 55 mesh on the one hand with corresponding groups of planet gears 9, and on the other hand with ring gear 7 of central differential 4. The groups of planet gears 9 in turn mesh with sun gear 10.

Viscous system 16 placed between the outputs of movement of central differential 4, is provided in the extension of said central differential 4, and inside of rear housing 26. In the embodiment represented in the figure, viscous system 16 has:

its hub 17 which is solid with rear drive shaft 15 connected to sun gear 10 of said central differential 4;

its ring part 18 which is connected to drive flange 14 of planet carrier 12 of said central differential 4;

its support flange 19 which is solid with ring part 18;

its closing flange 20;

its sealing means which consist of two seals 21, which are placed between said hub 17 and said flange 19 on the one hand, and said closing flange 20 on the other hand; and a seal 22 placed between said closing flange 20 and said ring part 18.

According to an embodiment of the invention shown in FIG. 3, secondary shaft 2 is solid with the input of movement of central differential 39, which is done by ring gear 57. An output of movement of central differential 39 is done by sun gear 41 which is solid with a secondary pin 42 coaxial [with] secondary shaft 2, and goes inside of this secondary shaft 2. The secondary pin ends by drive gear 3. The other output of movement of central differential 39 is done by planet carrier 44 of said central differential 39.

Planet carrier 44 is mounted inside of the hub of ring gear 57, by means of its hub 58. Planet gears 45 and 56 of central differential 39 are mounted on pins 49 supported by planet carrier 44 and by drive flange 47. In addition, a ring 53 is interposed between hub 58 and ring gear 57.

A rear drive shaft 50 is connected to drive shaft 34 by means of coupling plate 38. This rear drive shaft 50 is supported by a bearing 35 mounted in closing flange 27. This rear drive shaft 50 is also supported by end 36 of drive gear 3 and of secondary pin 42 by means of a needle bearing 37.

Viscous system 31 placed between the outputs of movement of central differential 39, is provided in the extension of said central differential 39, and inside of rear housing 26. In the embodiment shown in FIG. 3, viscous system 31 has:

its hub 40 solid with drive gear 3 by means of secondary pin 42 which is connected to sun gear 41 of said central differential 39;

its ring part 42 which is connected to drive flange 47 of planet carrier 44 of said central differential 39;

its support flange 48 solid with ring part 43;

its closing flange 49 solid with rear drive shaft 50 and connected to said ring part 43;

its sealing means, which consist of two seals 51 which are placed respectively between hub 40, and said support flange 48 on the one hand, and said closing flange 49 on the other hand; and a seal 52 placed between said closing flange 49 and said ring part 43.

I claim:

1. A four wheel drive transmission device, comprising:
   a transmission having a secondary shaft;
   a central differential comprising a ring gear connected to said secondary shaft, a sun gear and a planet carrier having planet gears;
   a ring gear fixed to a front differential;
   a drive gear meshing with said front differential ring gear and having a shaft extending coaxially through said secondary shaft and being fixed to one of said planet carrier and said sun gear; and
   a rear drive shaft coaxial with said shaft of said drive gear and being fixed to the other of said planet carrier and said sun gear, whereby said secondary shaft comprises an input of said central differential and said drive gear and rear drive shaft comprise outputs of said central differential.

2. The four wheel drive transmission device of claim 1 including a speed differential retardation device connected between said central differential outputs.

3. The four wheel drive transmission device of claim 2 wherein said speed differential retardation device comprises a viscous system.

4. The four wheel drive transmission device of claim 3 wherein said viscous system comprises a sealed assembly of interdigitated discs and a viscous fluid.

5. The four-wheel drive transmission device according to claim 4, wherein the viscous system comprises:
   a hub solid with the rear drive shaft which is connected to the sun gear of said central differential;
   a ring part connected to a drive flange of said planet carrier;
   closing and support flanges;
   sealing means which consist of two seals placed respectively between said hub and said support flange on the one hand and said hub and said closing flange on the other hand; and a seal placed between said closing flange and said ring part.

6. The four-wheel drive transmission device according to claim 4, wherein the viscous system comprises:
   a hub solid with the drive gear which is connected to the sun gear of said central differential;
   a ring part connected to the drive flange of the planet carrier;
   a support flange solid with said ring part;
   a closing flange solid with said rear drive shaft and connected to said ring part;
   sealing means, which consist of two seals which are placed respectively between said hub and said support flange on the one hand, and said hub and said closing flange on the other hand; and a seal placed between said closing flange and said ring part.

7. The four wheel drive transmission device of claim 1 in combination with a vehicle, wherein said secondary shaft extends parallel to the length of said vehicle.

* * * * *